(12) United States Patent
Goldthwaite et al.

(10) Patent No.: US 7,188,089 B2
(45) Date of Patent: Mar. 6, 2007

(54) SYSTEM AND METHOD FOR SECURELY STORING, GENERATING, TRANSFERRING AND PRINTING ELECTRONIC PREPAID VOUCHERS

(75) Inventors: Scott Goldthwaite, Hingham, MA (US); Damien Balsan, Arlington, MA (US)

(73) Assignee: Way Systems, Inc., Wobury, MA (US)

(*) Notice: Subject to any disclaimer, the term of this patent is extended or adjusted under 35 U.S.C. 154(b) by 7 days.

(21) Appl. No.: 10/808,697

(22) Filed: Mar. 25, 2004

(65) Prior Publication Data

US 2004/0181463 A1   Sep. 16, 2004

Related U.S. Application Data

(63) Continuation-in-part of application No. 10/695,585, filed on Oct. 28, 2003, and a continuation-in-part of application No. 10/625,823, filed on Jul. 23, 2003, and a continuation-in-part of application No. 10/205,768, filed on Jul. 26, 2002.

(60) Provisional application No. 60/457,716, filed on Mar. 26, 2003.

(51) Int. Cl.
*H04L 9/00* (2006.01)

(52) U.S. Cl. .............. 705/67; 705/1; 705/26; 705/64; 705/65; 455/550; 455/558; 235/486

(58) Field of Classification Search ............ 705/1, 705/26, 27, 44, 64, 65, 66, 67; 455/567, 455/558, 550; 235/440, 486, 379, 382; 709/227; 257/679

See application file for complete search history.

(56) References Cited

U.S. PATENT DOCUMENTS

| | | | | |
|---|---|---|---|---|
| 5,923,082 | A * | 7/1999 | Takemura | 257/679 |
| 6,059,186 | A * | 5/2000 | Iijima et al. | 235/379 |
| 6,240,301 | B1 * | 5/2001 | Phillips | 455/558 |
| 6,292,561 | B1 | 9/2001 | Benson | |
| 6,467,685 | B1 * | 10/2002 | Teicher | 235/379 |

(Continued)

FOREIGN PATENT DOCUMENTS

WO     WO 99/66752     12/1999

OTHER PUBLICATIONS

Rankl, W. & Effing, W., "Smart Card Handbook," 1997, Wiley, (362-363).*

*Primary Examiner*—Yogesh C. Garg
(74) *Attorney, Agent, or Firm*—Aliki K. Collins; AKC Patents LLC

(57) ABSTRACT

A system and a method that utilizes transaction terminals equipped with smart card readers to download and store a batch of multiple prepaid electronic vouchers to a smart card, retrieve and decrypt individual prepaid vouchers from the smart card and print a voucher receipt with a printer in connection with the transaction terminal. The transaction terminals are in connection with a mobile transaction server that acts as a gateway to a prepaid system and routes transactions between transaction terminals and the prepaid system and between transaction terminals. A method for storing a voucher encryption key on a second smart card or hardware security module. The voucher encryption key is utilized to decrypt encrypted vouchers on a voucher repository smart card. The transaction terminals are mobile devices communicating to the mobile transaction server over wireless networks.

39 Claims, 10 Drawing Sheets

U.S. PATENT DOCUMENTS

| | | | |
|---|---|---|---|
| 6,592,031 B1* | 7/2003 | Klatt | 235/382 |
| 6,612,498 B1* | 9/2003 | Lipponen et al. | 235/486 |
| 6,795,327 B2* | 9/2004 | Deng et al. | 365/63 |
| 2001/0034720 A1* | 10/2001 | Armes | 705/65 |
| 2001/0042125 A1* | 11/2001 | Watanabe et al. | 709/227 |
| 2002/0196127 A1 | 12/2002 | Benson | |
| 2003/0065805 A1* | 4/2003 | Barnes, Jr. | 709/231 |
| 2003/0172145 A1* | 9/2003 | Nguyen | 709/223 |
| 2003/0200450 A1* | 10/2003 | England et al. | 713/189 |
| 2004/0093309 A1* | 5/2004 | Nakamura et al. | 705/65 |
| 2004/0116155 A1* | 6/2004 | Aisenberg | 455/558 |
| 2004/0122685 A1* | 6/2004 | Bunce | 705/1 |
| 2004/0129785 A1* | 7/2004 | Luu | 235/486 |
| 2004/0143730 A1* | 7/2004 | Wen et al. | 713/150 |
| 2005/0040233 A1* | 2/2005 | Korber et al. | 235/440 |

\* cited by examiner

SYSTEM AND METHOD FOR SECURELY STORING, GENERATING, TRANSFERRING AND PRINTING ELECTRONIC PREPAID VOUCHERS

CROSS REFERENCE TO RELATED CO-PENDING APPLICATIONS

This application claims the benefit of U.S. provisional application Ser. No. 60/457,716 filed on Mar. 26, 2003 and entitled SYSTEM AND METHOD FOR SECURELY STORING, GENERATING, TRANSFERRING AND PRINTING ELECTRONIC PREPAID VOUCHERS, which is commonly assigned and the contents of which are expressly incorporated herein by reference.

This application is also a continuation in part of U.S. application Ser. Nos. 10/205,768, 10/625,823, and 10/695,585, filed on Jul. 26, 2002, Jul. 23, 2003, and Oct. 28, 2003, and entitled "SYSTEM AND METHOD FOR PAYMENT TRANSACTION AUTHENTICATION", "MOBILE DEVICE EQUIPPED WITH A CONTACTLESS SMART CARD READER/WRITER", and "MOBILE COMMUNICATION DEVICE EQUIPPED WITH A MAGNETIC STRIPE READER", respectively, the contents of which applications are expressly incorporated herein by reference.

FIELD OF THE INVENTION

The present invention relates to a system and a method for securely storing prepaid top up vouchers on a smart card and utilizing mobile devices to generate the vouchers at the time of purchase.

BACKGROUND OF THE INVENTION

The market for mobile/wireless phone usage has rapidly expanded to reach over 1 billion subscribers throughout the world by the end of 2002. Over 60% of these subscribers prepay for mobile phone usage. The greatest growth of mobile phone subscribers occurs in economically underdeveloped and emerging economies, where it is also common to prepay for many other recurring services, such as utility bills, due to the lack of consumer credit infrastructure.

Referring to FIG. 1 and FIG. 2, a prior art method 100 for prepaying for mobile phone services includes the following steps. First, a customer 110 pays a merchant 120 (111) and receives a scratch card 160 in return (112). Scratch card 160 includes a hidden authorization code 180 covered with a protective coating 170. Customer 110 removes the protective coating 170 using a coin or fingernail to reveal the hidden authorization code 180. Authorization code 180 is also referred to as a "hidden recharge number" (HRN) or a "voucher" or a "voucher number". Next, customer 110 contacts a mobile operator 130 and provides the mobile operator 130 with the authorization code 180 through the mobile operator's call center or an interactive voice response system (113). Mobile operator 130 validates the authorization code 180, "recharges" or "tops up" customer's mobile account with the value associated with the authorization code 180, and notifies customer 110 upon completion of the top up transaction (114). The merchant 120 purchases scratch cards in bulk in multiple denominations for multiple mobile operators 130 from either a scratch card distributor 150 (115) or a wholesaler 140 (118). Typically wholesaler 140 purchases mobile airtime minutes in bulk in advance from several mobile operators 130 (117), manufactures the scratch cards 160 and sells the cards either directly to merchants 120 (118) or through a distributor 150 (116). Typically, merchants 120 are convenience stores, department stores or supermarkets that sell many other types of consumer merchandise. In one example, merchant 120 is a Sam's Club and scratch card 160 is an AT&T phone card. Although this is the most widely used method for topping up mobile phone accounts, the costs associated with scratch card manufacturing, distribution, inventory and potential fraud result in reduced profitability for the mobile operator 130. These costs could represent up to 30% of the face value of the scratch card 160. For example for a typical scratch card 160 with a face value amount of $100, the mobile operator only realizes about $70 in revenue due to the above mentioned costs associated with scratch cards.

Dedicated Point of Sale (POS) terminals and Automated Teller Machines (ATMs) are also used to provide a more cost effective way to top up mobile prepaid accounts by electronically generating and printing the voucher at the time of the purchase. Referring to FIG. 3, a prior art method 200 for topping up mobile prepaid accounts includes the following steps. First, customer 110 pays merchant 120 (211). Merchant 120 engages a Point of Sale (POS) Terminal 121 to connect over a telecommunication network 80 to a remote prepaid system 190 (210, 215). Merchant 120 generates a voucher number (not shown) and prints the voucher number onto a receipt 123 using a printer 122 that is in connection with the POS terminal 121. Next, merchant 120 provides the customer 110 with the voucher receipt 123 that contains the voucher number (not shown) (212). Next, customer 110 provides the mobile operator 130 with the voucher number printed on the voucher receipt 123 (213), the mobile operator 130 validates the voucher number and tops up the customer's mobile account with the value associated with the voucher number (214). Mobile operator 130 also notifies customer 110 upon completion of top up transaction (214). These electronic vouchers are created "online" one at a time by the POS terminal 121 by connecting to prepaid system 190 for each customer 110. Alternatively, the POS terminal 121 connects to the prepaid system 190 less frequently, downloads a batch of multiple vouchers that are securely stored within the memory of the POS terminal 121 and subsequently generates the electronic vouchers "offline" for each customer 110. The problem with this prior art method is the fact that there are not many POS or ATMs readily available to accommodate the number of transactions and users. Accordingly, there is a need for a low cost alternative for a mobile POS or ATM that can securely, store, generate, transfer and print electronic prepaid vouchers.

SUMMARY OF THE INVENTION

In general, in one aspect of this invention features a system for generating and storing one or more prepaid electronic vouchers in a voucher smart card. The system includes a voucher host system adapted to generate the prepaid electronic vouchers and a voucher terminal adapted to receive the prepaid electronic vouchers from the voucher host system over a network connection and to store the prepaid electronic vouchers in the voucher smart card.

Implementations of this aspect of the invention include the following. The system may further include a transaction server adapted to mediate and aggregate transactions and communications between the voucher terminal and the voucher host system over the network connection. The voucher smart card may be a removable smart card such as a "full size" smart credit card, a "full size" smart debit card, a "plug-in" Subscriber Identification Module (SIM) smart card, a "plug-in" Secure Access Module (SAM) smart card, a contactless smart card, a stored-value card, a coupon card, a reward card, an electronic cash card, a loyalty card, an identification card or combinations thereof. The voucher smart card may be a hardware security module (HSM) such as microprocessors or storage accessories. The voucher terminal may be a wireless communication device equipped with a smart card reader/writer module such as a mobile phone, a personal digital assistant (PDA), a pager, a point of sale (POS) terminal, a television remote control, a personal computer or combinations thereof. The smart card reader/writer module is adapted to receive and read/write information stored in/to the voucher smart card, respectively. The voucher terminal may be a wired communication device equipped with a smart card reader/writer module such as a phone, a wired personal digital assistant (PDA), a point of sale (POS) terminal, a television, a personal computer or combinations. The voucher terminal may be a wireless communication device having a subscriber identification module (SIM) card slot, a smart card reader/writer module electrically connected to the SIM card slot and the smart card reader/writer module is adapted to receive and read/write information stored in/to the voucher smart card, respectively. The network may be the Internet, a telecommunications network, a wireless wide area network (WWAN), a wireless local area network (WLAN), a personal area network (PAN) or a private communication network. The wireless wide area network (WWAN) may be a Global System for Mobile Communications (GSM), General Packet Radio Service (GPRS), a Code Division Multiple Access (CDMA), CDMA 2000, or wideband CDMA (WCDMA). The communications between the voucher host system and the voucher terminal may have a format such as Short Message Service (SMS), General Packet Radio Service (GPRS), Transmission Control Protocol/Internet Protocol (TCP/IP), User Datagram Protocol (UDP), Simple Mail Transmission Protocol (SMTP), Simple Network Management Protocol (SNMP), or proprietary message formats. The system may also include a printer adapted to connect to the voucher terminal for printing hard copies of the prepaid electronic vouchers. The printer may be connected to the voucher terminal via a wired connection such as a serial connection, a parallel connection, a Universal Serial Bus (USB) connection or a mini USB connection. Alternatively, the printer may connect to the voucher terminal via a wireless connection such as infrared, Bluetooth, 801.1x, or other short-range radio frequency connections. The prepaid electronic vouchers may have data such as a mobile operator code, a voucher number, a voucher expiration date, the voucher number in an encrypted format, a voucher value, a voucher currency code, a voucher product code, a voucher product description, a voucher owner code, or a voucher owner. The prepaid electronic vouchers may have encrypted data and the system may further include a voucher encryption smart card that has a voucher encryption key for decrypting the encrypted data. The voucher encryption key may be a personal identification number (PIN), a private key, a public key, a symmetric key or an asymmetric key. The decrypting may utilize techniques such as symmetric keys, asymmetric keys, data encryption standard (DES, 3DES), RSA, elliptical curve cryptography (ECC), message authentication codes (MAC, HMAC, SHA-1, AES, and public key infrastructure (PKI). The voucher terminal may further include a first voucher application and the first voucher application may provide for retrieving of the stored electronic prepaid vouchers from the voucher smart card and printing hard copies of the prepaid electronic vouchers. The first application may further provide decrypting encrypted data stored in the electronic prepaid vouchers. The voucher terminal may further include a second voucher application and the second voucher application may provide transferring one or more of the stored prepaid electronic vouchers from the voucher smart card to another voucher smart card.

In general in another aspect the invention features a method for generating and distributing one or more prepaid electronic vouchers issued by a merchant for providing a service or a product. The method includes providing a voucher host system adapted to generate the prepaid electronic vouchers and providing a voucher terminal adapted to receive the prepaid electronic vouchers from the voucher host system over a network connection and to store the prepaid electronic vouchers in a voucher smart card. Next, placing a purchase order and paying for one of the one or more prepaid electronic vouchers from the voucher terminal to the voucher host system over the network connection. Next, downloading the one prepaid electronic voucher from the voucher host system to the voucher terminal over the network connection and storing the one prepaid electronic voucher in the voucher smart card. Next, retrieving the one prepaid electronic voucher from the voucher smart card and presenting the one prepaid electronic voucher to the merchant and receiving the service or product.

Implementations of this aspect of the invention include the following. The method may further include printing a hard copy of the one prepaid electronic voucher before presenting the one prepaid electronic voucher to the merchant. The electronic prepaid voucher may have encrypted data and the method may further include decrypting the encrypted data by inserting an encryption smart card in the voucher terminal, retrieving an encryption key and using it to decrypt the encrypted data. The method may further include transferring the one prepaid voucher from the voucher smart card to a second voucher smart card or to a second voucher terminal.

Among the advantages of this invention may be one or more of the following. When compared to the scratch card method the advantages to storing vouchers on a smart card instead of printing the vouchers onto scratch cards are cost and security. Although the cost of a smart card is significantly higher than a paper or plastic scratch card, the smart card can be used thousands of times to store vouchers whereas the scratch card is used once by the customer and then discarded. Vouchers represent monetary value and therefore security is extremely important. Storing encrypted voucher numbers on a smart card is inherently more secure than scratch cards for several reasons. Scratch cards themselves have no "built in" securities features and rely on a secure manufacturing, distribution and sales environment. In the event of theft of a batch of scratch cards, the person in possession of the scratch cards needs only to remove the protective coating on the card to access the voucher number, a breach in security can occur at the merchant location or at any point in the scratch card manufacturing and distribution process. Smart Cards, however, have many "built in" security features that establish a tamper resistant environment for securely storing data from logical and physical attacks which is the primary reason that the financial industry is moving away from magnetic stripe cards to smart cards for debit, credit and electronic cash applications and the primary reason that mobile network operators utilize Subscriber Identity Module (SIM) smart cards. In the event of theft of a smart card with vouchers, the person in possession of the smart card would first have to compromise the security of the smart card to access the encrypted vouchers, then compromise the voucher encryption key that may be stored on the same card or on a different card. The expense and time required to successfully carry out such an attack is significantly more costly than the value of the vouchers on the smart card.

When compared to other Point of Sale (POS) voucher methods, the present invention has the advantage of mobility. The existing prior art POS voucher methods store the vouchers within the device but do not separate storage from fulfillment, i.e., one device is used for both purposes. In the present invention, vouchers are stored on a removable smart card that can be used by one device for voucher storage transactions and then removed and inserted into another device for voucher generation and printing. The present invention provides secure mobility for voucher generation and printing enabling one transaction device to store transactions on a smart card and multiple devices can be deployed to service customer needs remotely.

DETAILED DESCRIPTION OF THE INVENTION

The present invention describes a system and a method for using a transaction terminal for downloading and storing prepaid electronic vouchers on a first smart card, retrieving and decrypting prepaid vouchers from the first smart card and printing a voucher receipt in a printer that is connected with the transaction terminal. The present invention also describes a system and a method for storing a voucher encryption key on a second smart card and then using the second card to decrypt encrypted vouchers on the first smart card. The present invention also describes a system and a method of transferring prepaid vouchers between voucher smart cards.

Figure 1:
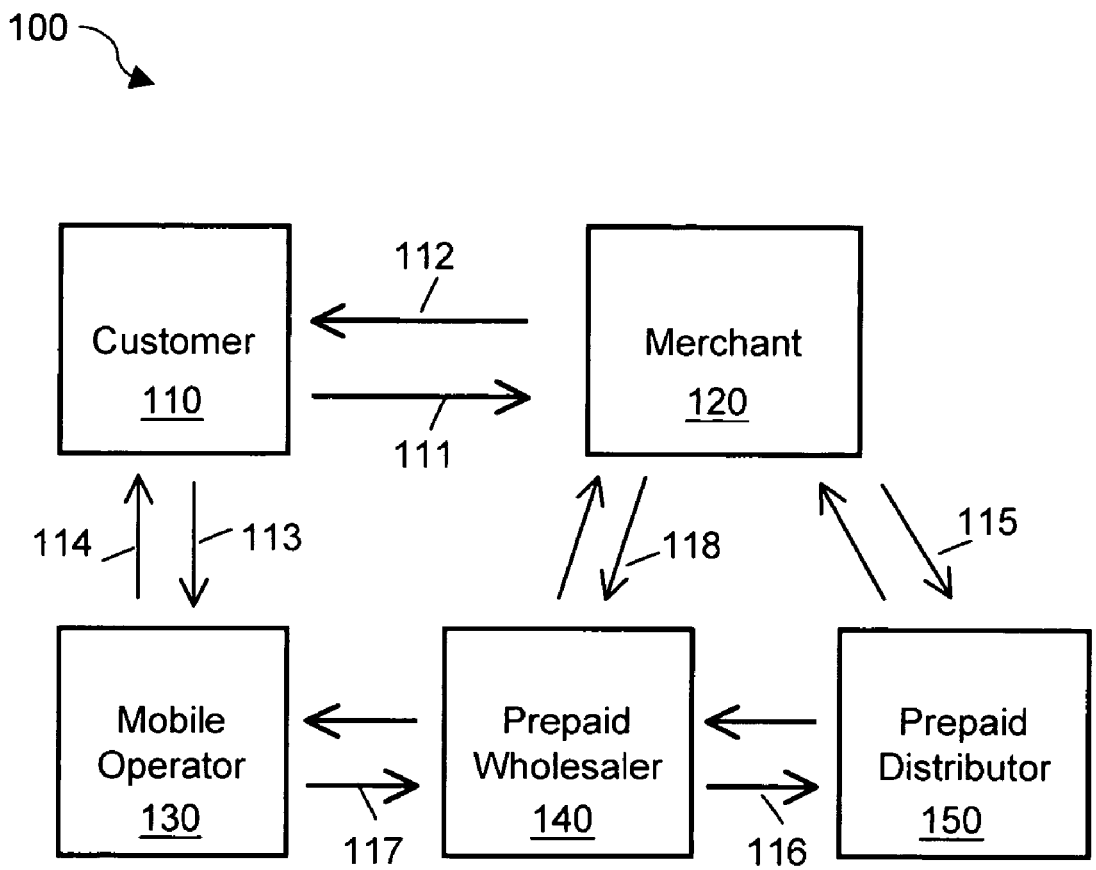
FIG. 1 is a block diagram of a prior art system for prepaying for mobile phone services.
Figure 2:
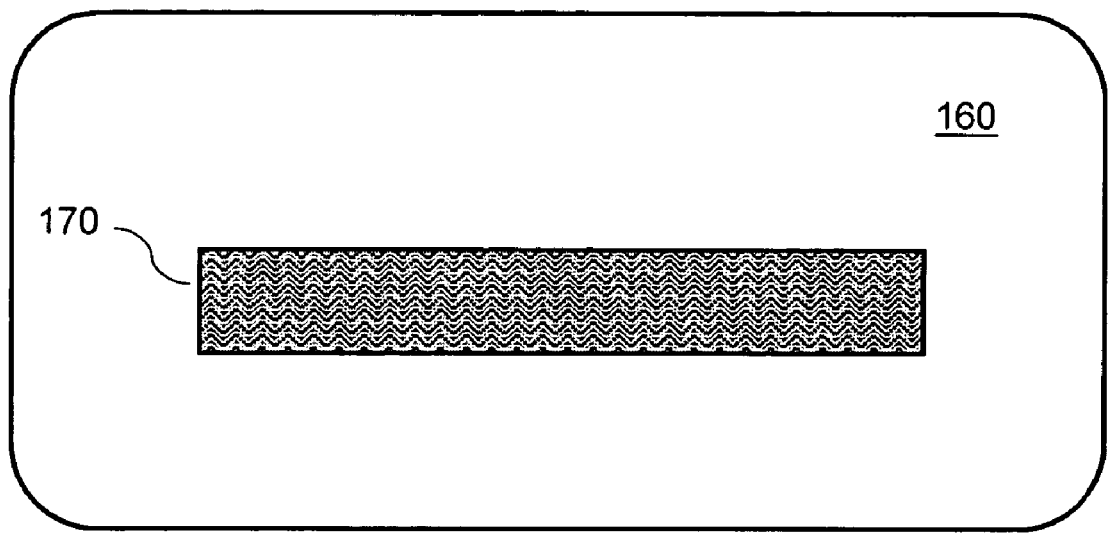
FIG. 2 is a schematic diagram of a prior art prepaid phone scratch card.
Figure 2:
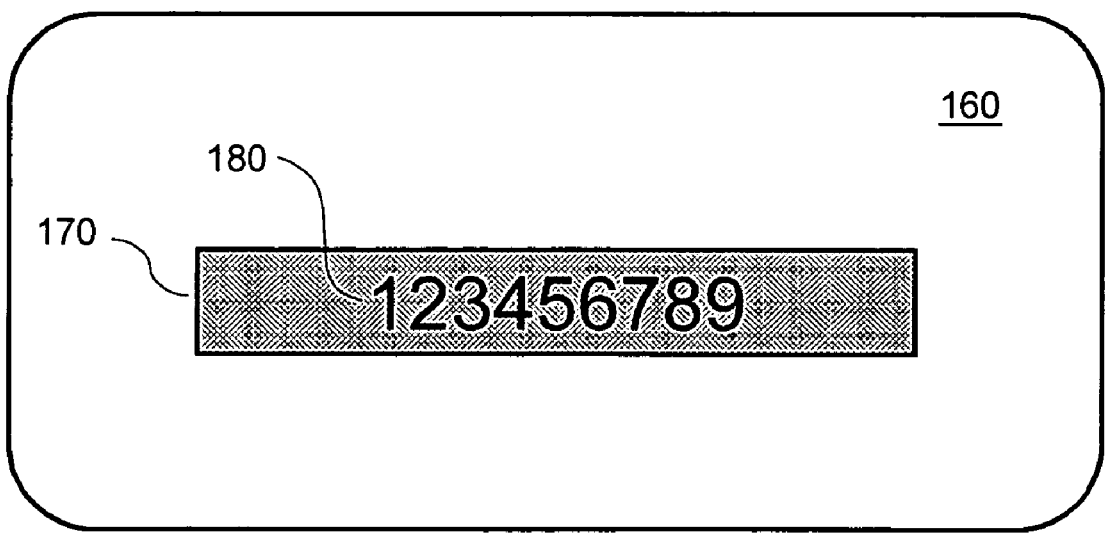
Figure 3:
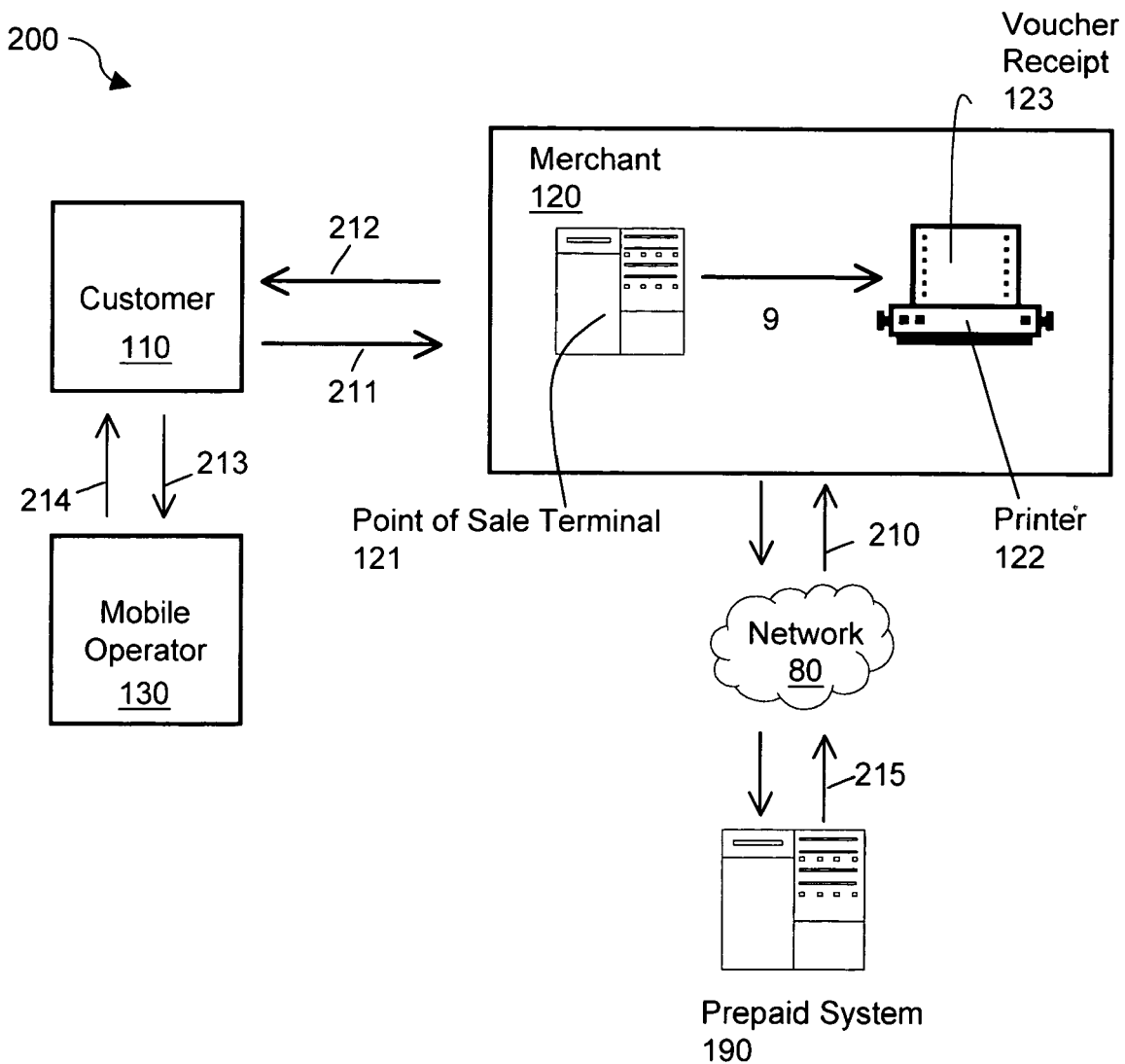
FIG. 3 is schematic diagram of a prior art electronic prepaid voucher system.
Figure 4:
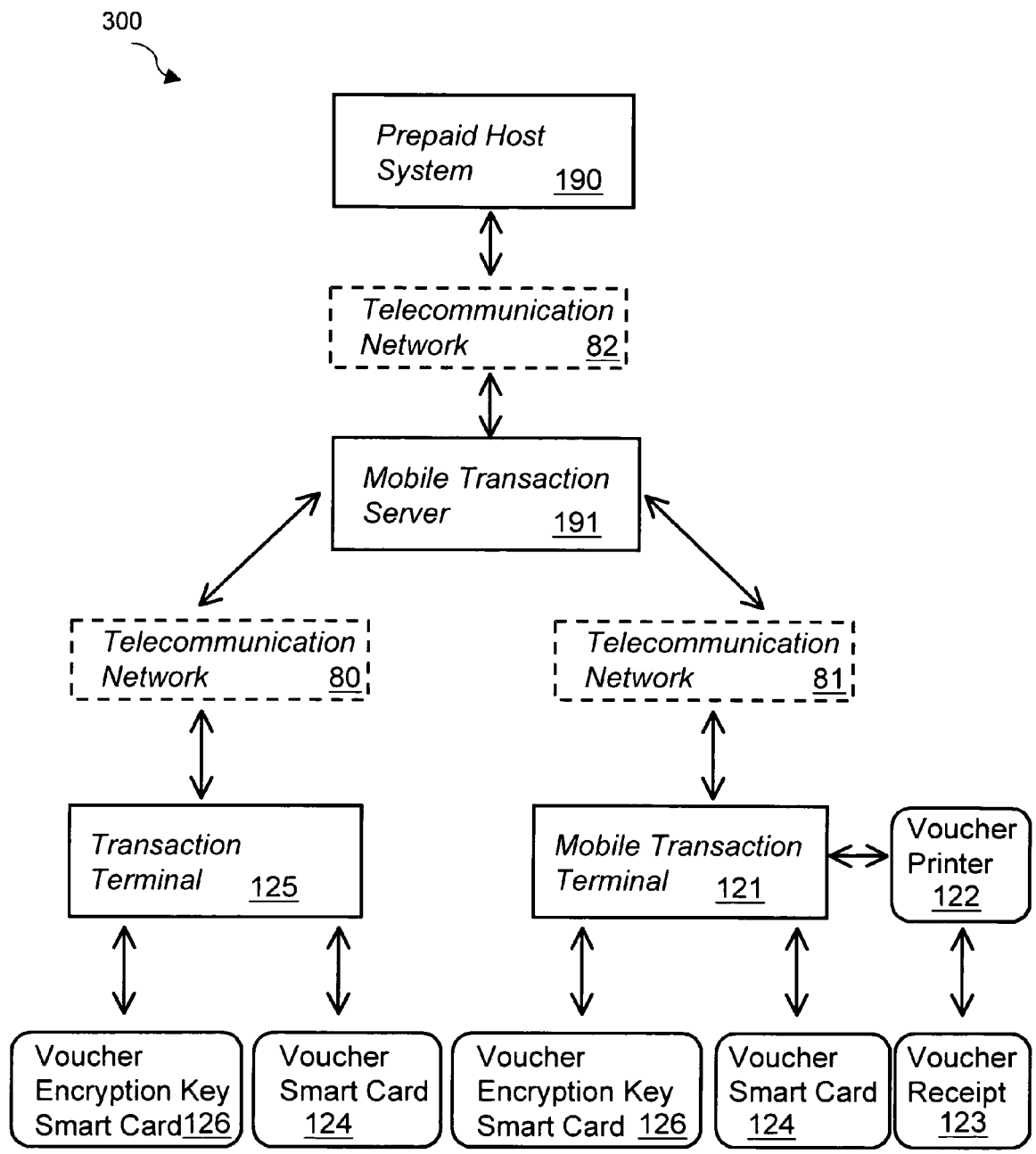
FIG. 4 is schematic diagram of an electronic prepaid voucher system that utilizes smart cards according to this invention.

Referring to FIG. 4, a system 300 for downloading and storing prepaid electronic vouchers on a smart card includes a Prepaid Host System 190, a Mobile Transaction Server 191, a Transaction Terminal 125, a Mobile Transaction Terminal 121, a Printer 122, a Voucher Smart Card 124, a Voucher Encryption Key Smart Card 126, and a Voucher Receipt 123. The Prepaid Host System 190 is the primary source for generating voucher information. The Mobile Transaction Server 191 connects to the Prepaid Host System 190 over telecommunication network 82 and to the transaction terminal 125 and the mobile transaction terminal 121 over telecommunication networks 80, and 81 respectively. Mobile Transaction Server 191 functions as a gateway that mediates and aggregates the transactions between the Prepaid Host System 190 and the transaction terminal 125 and the mobile transaction terminal 121. In one example, Voucher Smart Card 124 and Voucher Encryption Key Smart Card 126 are removable smart cards including "full-size" smart cards, such as credit cards, debit cards, contactless smart cards, stored-value cards, coupon cards, reward cards, electronic cash cards, loyalty cards, identification cards and secure access application or "plug in" format smart cards like those used for Subscriber Identity Modules (SIM's) smart cards utilized by mobile telephones or Secure Access Modules (SAM's) smart cards utilized by Point of Sale (POS) devices. In another example Voucher Smart card 124 and Voucher Encryption Card are hardware security modules (HSM) including accessories that are added to computers, servers and Personal Digital Assistants (PDA's) for banking and secure access applications and secure microprocessors that are utilized by Point of Sale (POS) devices. Voucher Encryption Key smart cards have the ability to securely store data and resist tampering and can generate cryptographic keys and encrypt/decrypt data utilizing a cryptographic co-processor. Telecommunications networks 80, 81 and 82 can be the Internet, a public telecommunication network, a private telecommunication network, a local area network (LAN) wireless wide area network (WWAN), a wireless local area network (WLAN) or a personal area network (PAN). The data exchanged using telecommunications networks 80, 81 and 82 have a format such as Short Message Service (SMS), User Datagram Protocol (UDP), Simple Mail Transmission Protocol (SMTP), or Simple Network Management Protocol (SNMP) over Transmission Control Protocol/Internet Protocol (TCP/IP). Transaction Terminal 125 and Mobile Transaction Terminal 121 are capable of receiving a voucher smart card and printing a voucher receipt 123 via a printer 122 (not shown for Terminal Transaction 125).

Figure 10:
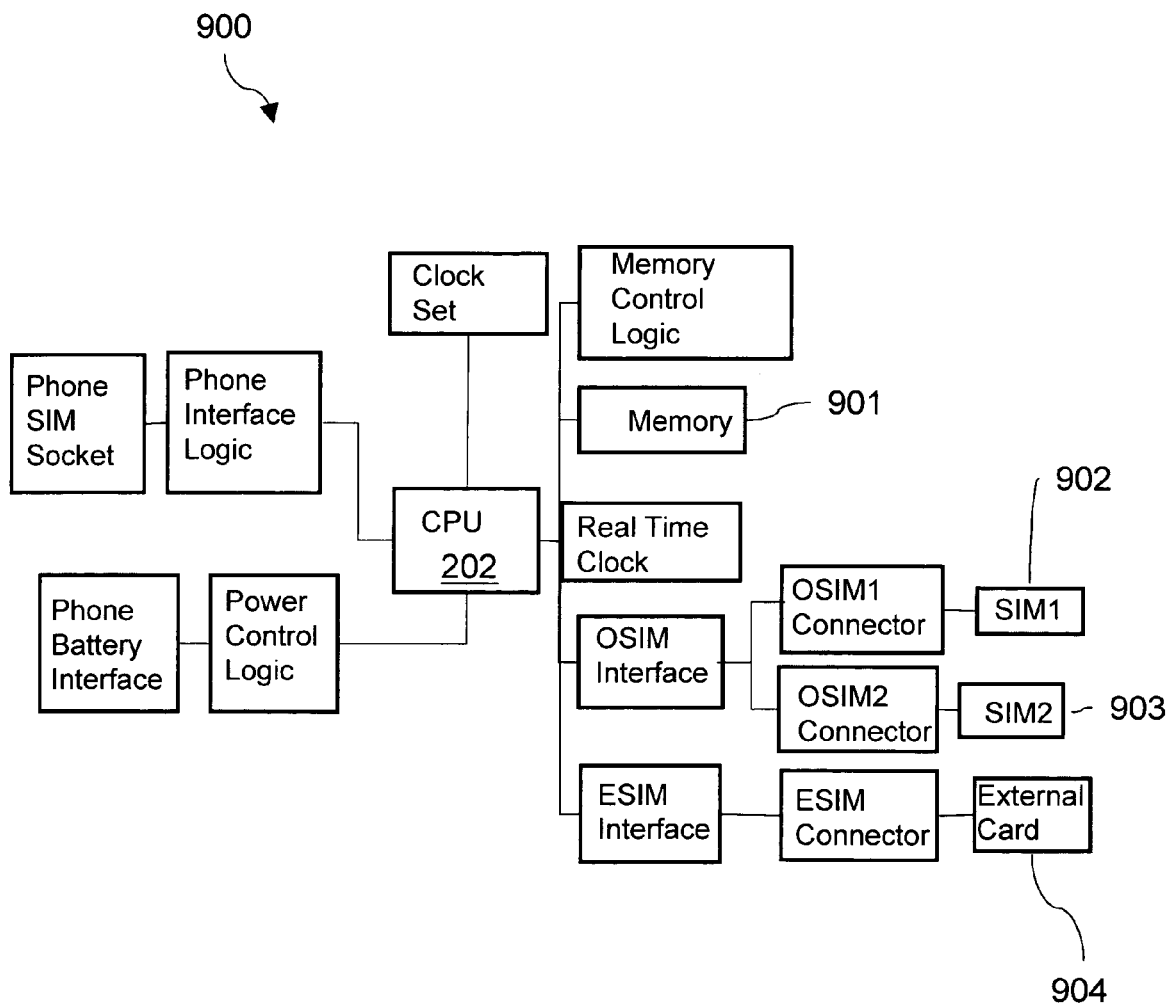
FIG. 10 is a block diagram of a prior art transaction terminal capable for receiving smart cards.

Referring to FIG. 10, in one example, the transaction terminal 125 is a mobile phone that is capable of receiving smart cards 902, 903, 904 as described in PCT application WO 99/66752 entitled "Communication Method and Apparatus Improvement", the entire content of which is incorporated herein by reference. In other examples, the transaction terminal 125 is a Point of Sale terminal equipped with a smart card reader, or a Personal Computer (i.e. laptop, desk top, workstation) equipped with a smart card reader or a Personal Digital Assistant (PDA) equipped with a smart card reader. Similarly, the mobile transaction terminal 121 is a mobile phone as shown in FIG. 10 equipped with a smart card reader, or a Personal Computer (i.e. laptop, desk top, workstation) equipped with a smart card reader or a Personal Digital Assistant (PDA) equipped with a smart card reader. In another example, the mobile transaction terminal 121 is a smart card reader equipped with a keypad and a display.

A merchant utilizes the present invention to sell prepaid vouchers to consumers, and the consumers use this invention to recharge their prepaid account. For example, at the beginning of each day, the merchant uses the transaction terminal device described in this invention to connect to a prepaid host system and download a batch of prepaid vouchers in various denominations to a smart card. The merchant may be a small convenient storeowner, a large supermarket sales clerk, an independent sales representative or a sales representative working for a telecommunication company. Throughout the day the merchant sells the prepaid vouchers to customers who are interested in purchasing a voucher. The customers pay the merchant with cash, credit or debit card. Alternatively, a customer approaches the merchant for purchasing a voucher. The merchant uses the transaction terminal device of this invention to retrieve a voucher from the smart card and prints a receipt for the customer with the voucher number on it. The customer then contacts his service provider and gives the voucher number to the service provider at which point the service provider validates the voucher number and "tops up" or "recharges" the customer's account. The voucher numbers are encrypted on the smart card. The encryption key required to decipher the encrypted information is stored on another smart card. Both cards, i.e., the smart card with the encrypted voucher number and the smart card with the encryption key, need to be present in the transaction terminal device of this invention in order to decrypt, retrieve and present a voucher number for the customer. This process of batch downloading and individual retrieving of vouchers may be distributed among several individuals. For example, a sales manager may download batches of vouchers to multiple smart cards and give each smart card to individual sales representatives. The sales manager may utilize separate smart cards for individual prepaid products, i.e. one card for a mobile operator and another smart card for a long distance telecommunication provider. The sales manager may require the individual sales representatives to pay a deposit or the full amount of value of the vouchers stored on the smart card in advance. Throughout the day, as the sales representatives deplete their inventory the sales manager may also transfer additional vouchers to sales representatives remotely using the transaction terminal device and system described in the present invention. At the end of the day, the sales representatives return their smart cards to the sales manager at which point the sales representatives and the merchant reconcile the financial transactions. Alternatively, the financial settlement may occur remotely and electronically.

Figure 5:
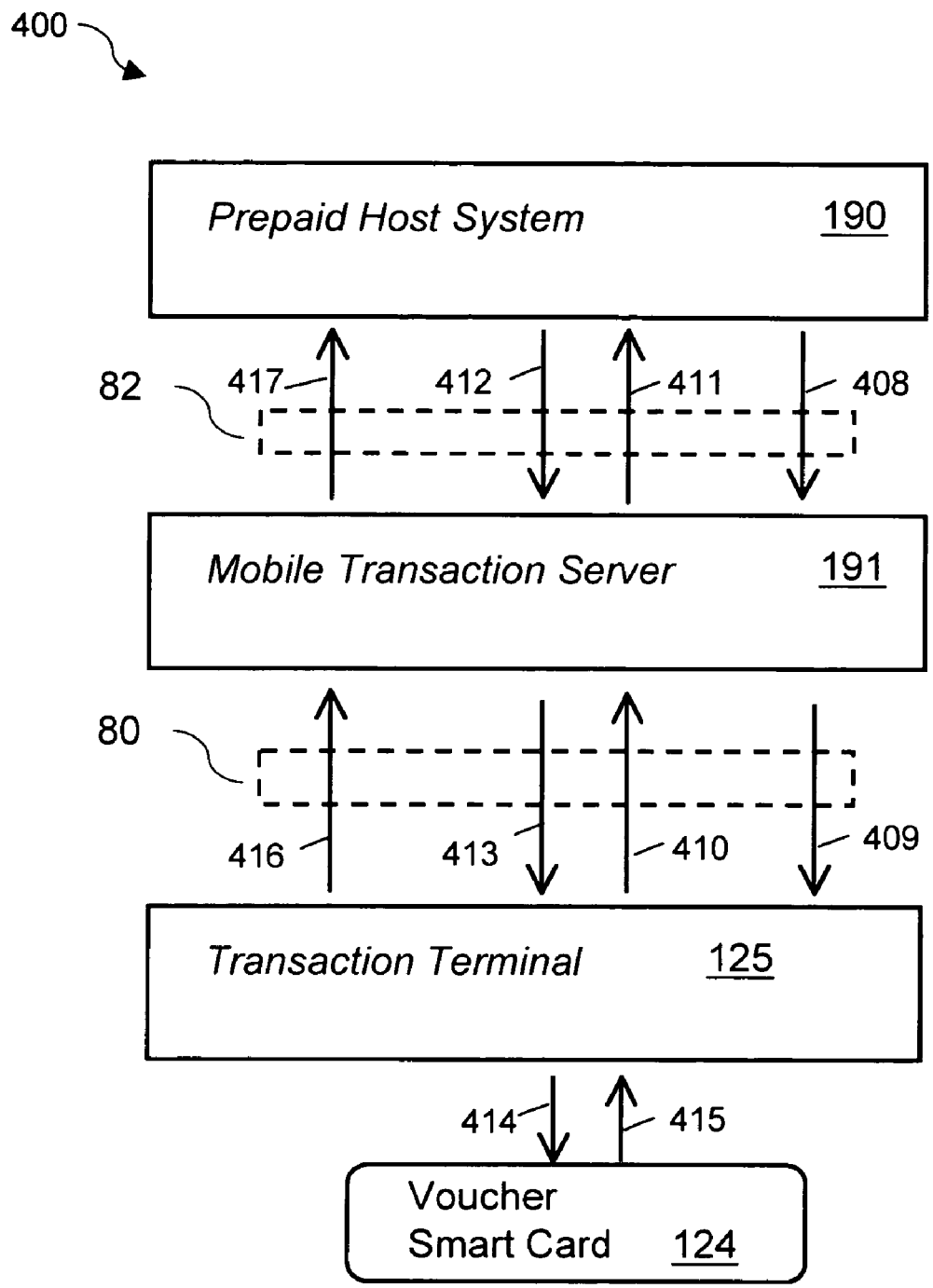
FIG. 5 is a flow diagram of a voucher download transaction to a smart card according to this invention.

Referring to FIG. 5, the process of downloading a voucher includes the following steps. First, the transaction terminal 125 establishes a connection with the mobile transaction server 190 over network 80 (410). Next, mobile transaction server 191 routes the transaction request to the prepaid host system 190 through network 82 (411). The prepaid host system 190 validates the connection and transmits a specified quantity and types of vouchers to the mobile transaction server 191 over network 82 (412). The mobile transaction server 191 routes the downloaded vouchers to the transaction terminal 125 through network connection 80 (413). In one example, the data in the voucher download transaction for a single voucher include, a code representing the mobile operator that the voucher is associate with, a voucher serial number, a voucher expatriation date, the voucher number in its encrypted format, the voucher value and a code representing the currency of the voucher value. Upon completion of the voucher download transaction, the transaction terminal 125 transmits a transaction complete acknowledgement to the mobile transaction server 191 through network connection 80 (416) and the mobile transaction server 191 transmits this acknowledgement to the prepaid host system 190 over network 82 (417). The transaction terminal 125 is in connection with a voucher smart card 124 and sends the voucher data to the voucher smart card 124 (414). Upon completion of the transaction the transaction terminal 125 receives an acknowledgement from the voucher smart card 124 (415). In one embodiment, the Prepaid Host System 190 determines the quantity and types of vouchers that are downloaded to the Transaction Terminal 125. In this embodiment the connection is initiated by the prepaid host system 190 (408, 409). In another embodiment, the Transaction Terminal 125 determines the quantity and types of vouchers that are downloaded to the Transaction Terminal 125.

Figure 6:
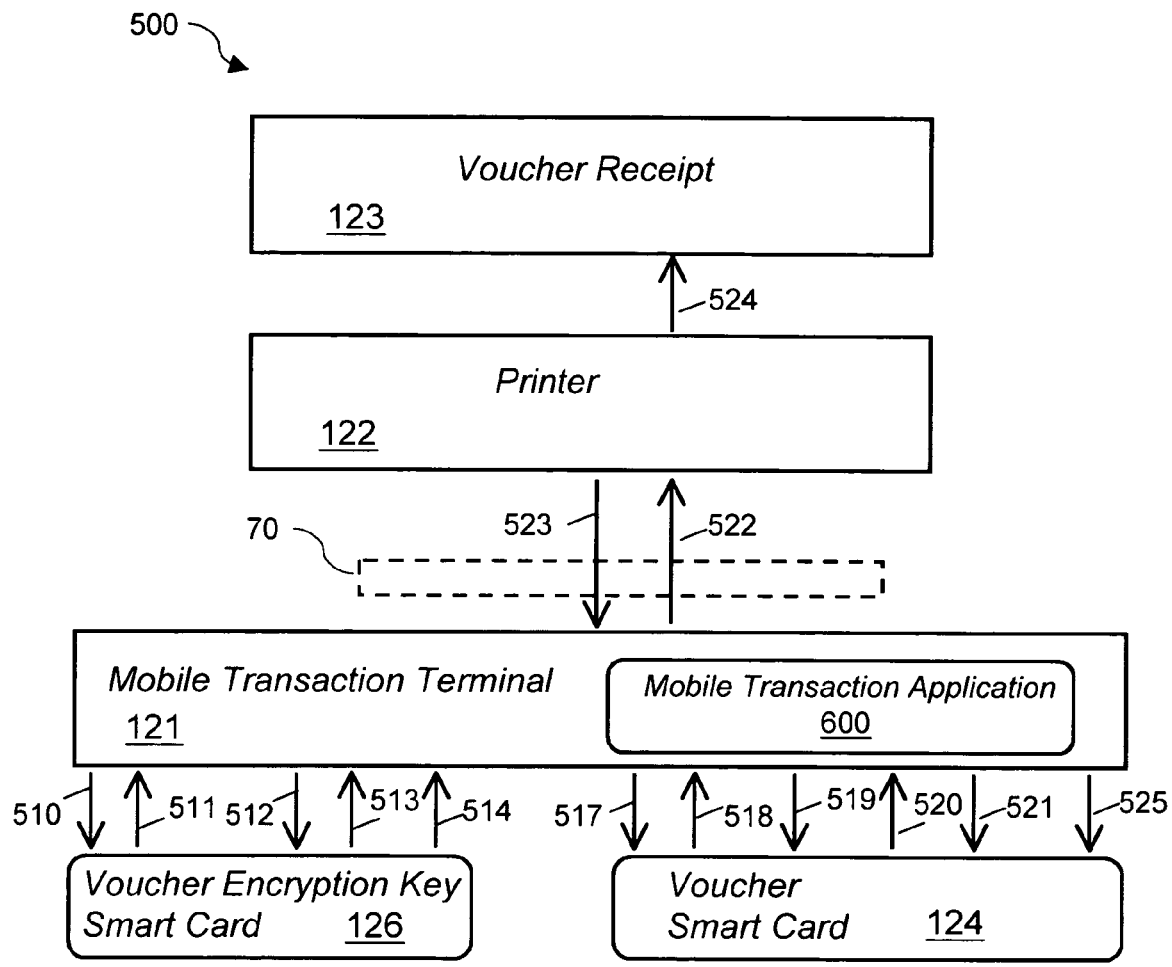
FIG. 6 is a flow diagram of a voucher generation transaction from a smart card and print transaction according to this invention.
Figure 7:
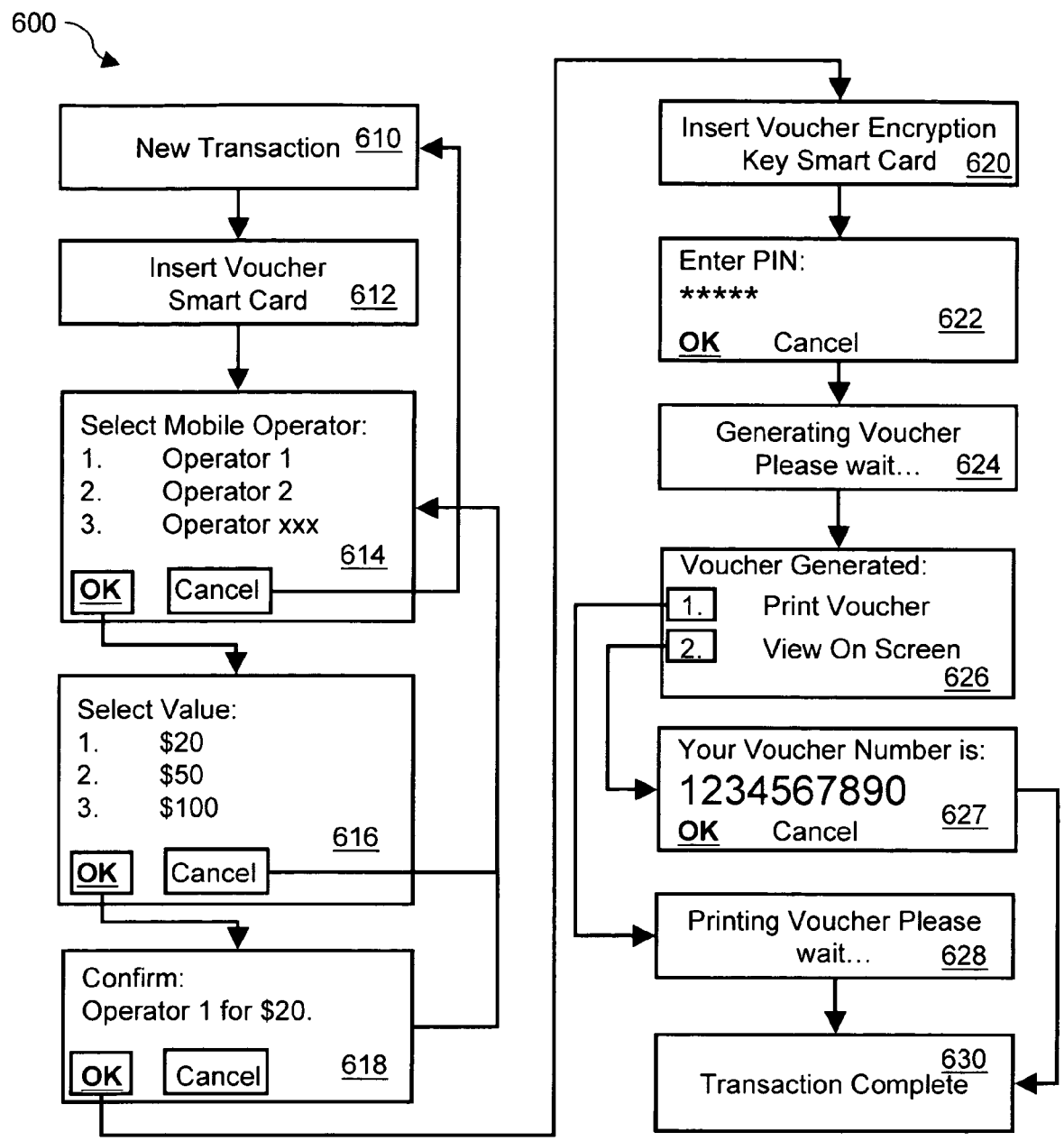
FIG. 7 is a diagram representing the screen flow and application logic of a mobile transaction terminal application according to this invention.

Referring to FIG. 6 and FIG. 7, a method 500 for retrieving a voucher from a smart card 124 and printing a voucher receipt 124 includes the following steps. First, a user utilizes a mobile transaction application 600 stored on the mobile transaction terminal 121 to start a new transaction (610). The user is then prompted to insert the voucher smart card 124 into the mobile transaction terminal 121 (612). The mobile transaction application 600 on the mobile transaction terminal 121 accesses the voucher smart card 124 (517) and retrieves the inventory of available vouchers (518). The inventory of available mobile operators is displayed on the mobile transaction terminal application and the user is prompted to make a selection (614). Following the selection of a specific mobile operator, the inventory of available voucher values for the selected mobile operator is displayed and the user is prompted to make a selection (616). Following the selection of a specific voucher, the user is prompted to confirm the selection (618). Upon confirmation, the mobile transaction application 600 accesses voucher smart card 124 (519), retrieves the voucher data associated with the confirmed selection (520), updates the inventory on the voucher smart card 124 (521) and stores the voucher data within the memory (not shown) of the mobile transaction terminal 121. Next, the mobile transaction application 600 accesses the voucher encryption key smart card 126 (510), and if the mobile transaction terminal 121 is not in connection with the voucher encryption key smart card 126, the user is prompted to insert the voucher encryption key smart card 126 (620). The mobile transaction application 600 accesses the voucher encryption key smart card 126 to retrieve smart card profile information (511). If the mobile transaction terminal 121 is configured to receive only one smart card, the user is asked to remove the voucher smart card 124 and replace it with the voucher encryption key smart card 126. In one example, the voucher encryption key smart card 126 is protected from unauthorized access with a Personal Identification Number (PIN) and the user is prompted to enter a valid PIN (622). The users types the PIN and the mobile transaction application 600 presents the PIN to the voucher encryption key smart card 126 (512) for authorization. The authorization result is returned to the mobile transaction application 600 (513) and upon successful authorization, the mobile transaction application 600 retrieves the voucher encryption key (not shown) (514). The voucher encryption key is utilized by the mobile transaction application 600 to decrypt the encrypted voucher information that was previously retrieved by the mobile transaction application 600 from the voucher smart card 124. The decryption process (not shown) utilizes symmetric keys or asymmetric keys and cryptographic techniques such as Data Encryption Standard (DES, 3DES), RSA, Elliptical Curve Cryptography (ECC), Message Authentication Codes (MAC, HMAC), SHA-1, AES and Public Key Infrastructure (PKI). When the voucher decryption is completed, the user is prompted to either print or view the decrypted voucher information on the screen (626). The mobile transaction terminal 121 is in connection with a printer 122. Communication 70 with the printer 122 is either wired (i.e. serial, parallel, USB) or wireless (i.e. infrared, Bluetooth, 802.1x).

If the user selects the print option, the mobile transaction terminal 121 establishes connection 70 with the printer 122 and sends the voucher data to the printer (522). The printer 122 formats the voucher data accordingly, generates voucher receipt 123 (524) and acknowledges results of print process to the mobile transaction terminal 121 (523). Alternatively, the user selects to present the voucher data on the display (not shown) of the mobile transaction terminal 121. The mobile transaction application 600 reestablishes connection with the voucher smart card 124 to update the voucher inventory with the completed transaction details (525). Once a voucher is retrieved, the voucher is either deleted from the inventory or its status is changed such that it can no longer be retrieved.

Figure 8:
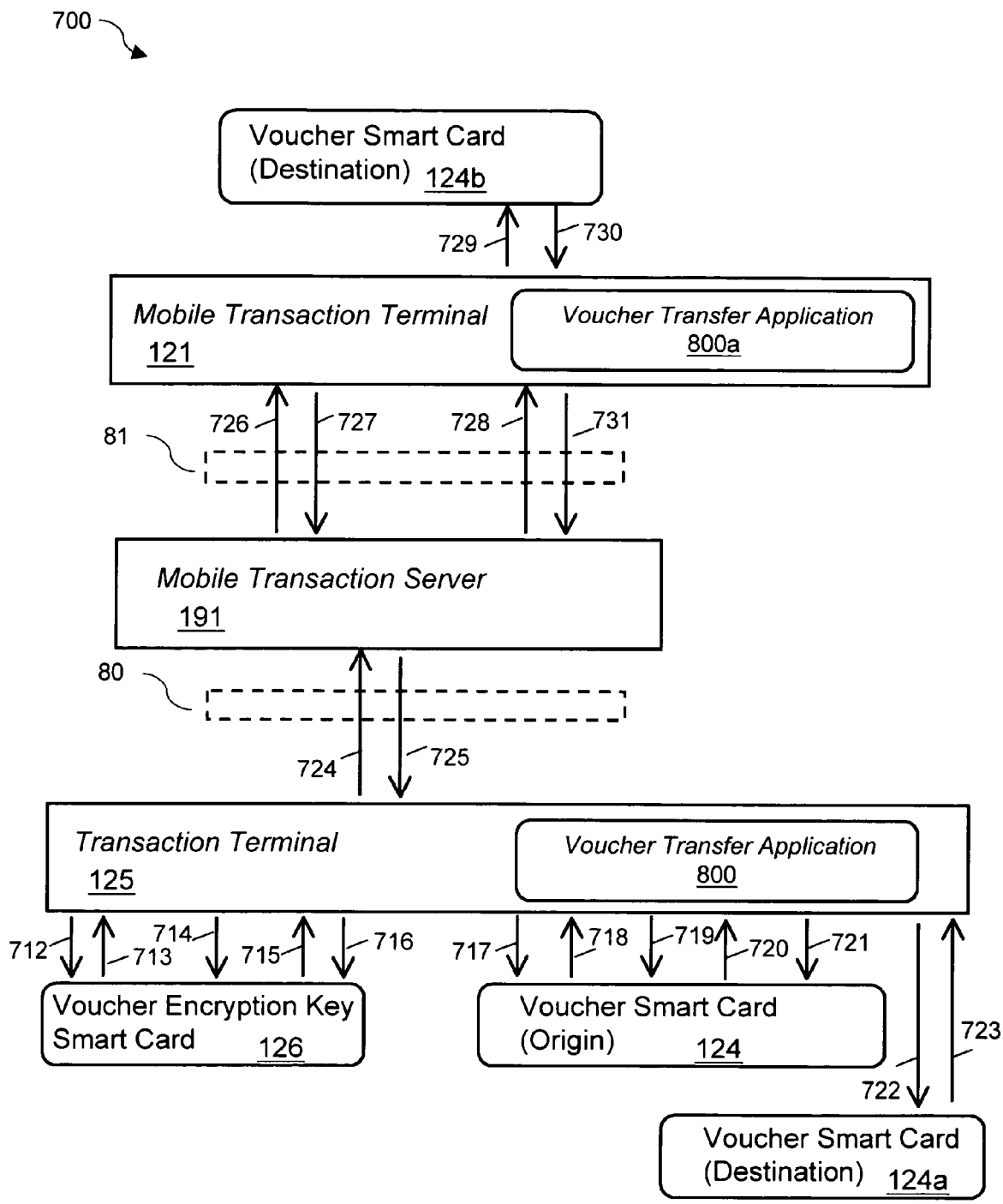
FIG. 8 is a flow diagram of a voucher transfer transaction according to this invention.
Figure 9:
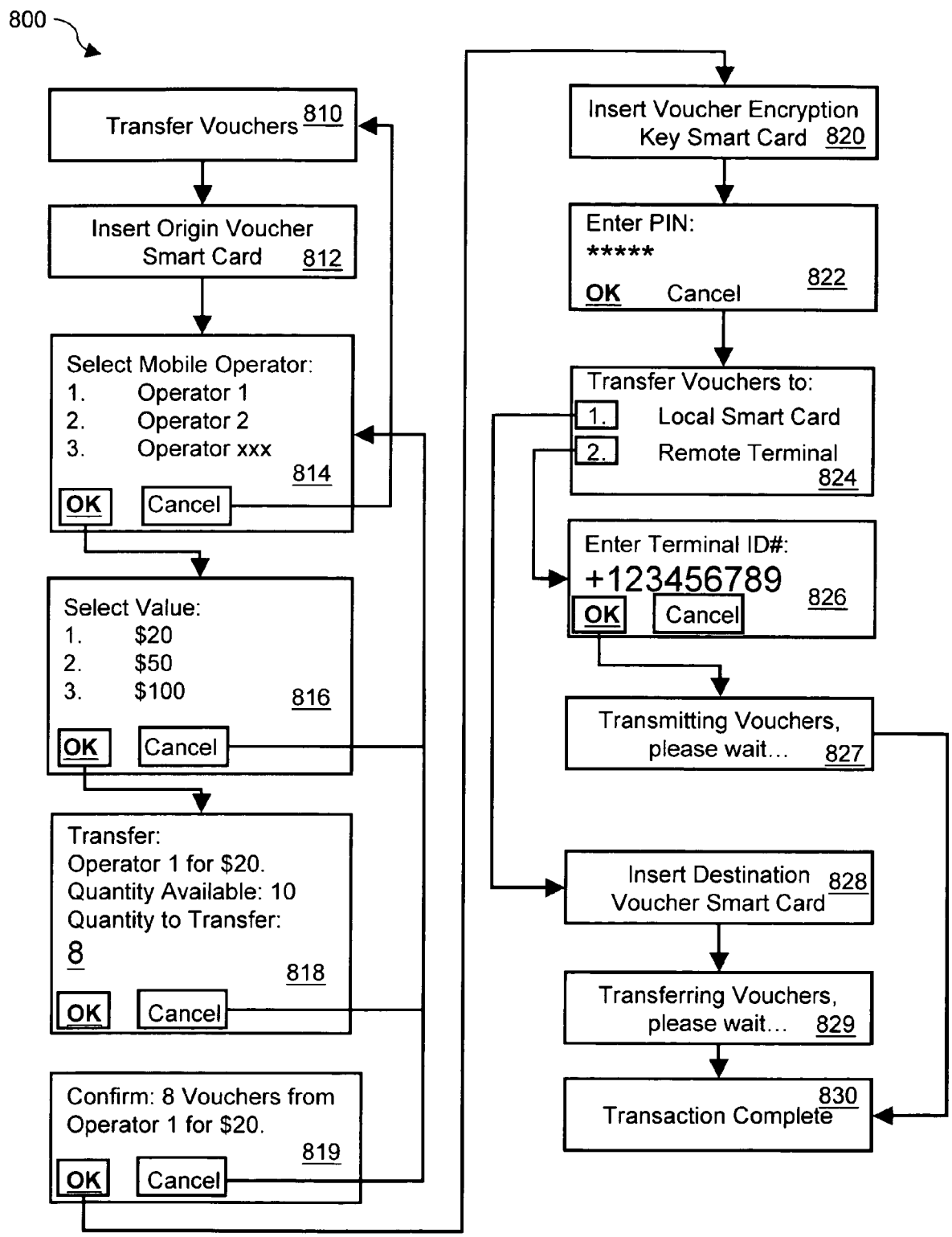
FIG. 9 is a diagram representing the screen flow and application logic of a voucher transfer transaction according to this invention.

The present invention also defines a process for transferring vouchers between voucher smart cards. In one case, the voucher transfer process is local and it uses the same transaction terminal (mobile or otherwise) to transfer vouchers from one voucher smart card to another voucher smart card. In another case the voucher transfer process is remote and it uses one transaction terminal (mobile or otherwise) to transmit voucher data to another transaction terminal (mobile or otherwise). Referring to FIG. 8 and FIG. 9, using voucher transfer application 800, a user initiates a voucher transfer transaction 700. The user is prompted to insert the origin voucher smart card 124 that stores the vouchers into the transaction terminal 125. The voucher transfer application 800 accesses voucher smart card 124 (717) and retrieves the inventory of available vouchers (718). The inventory of available mobile operators is displayed on the transaction terminal application and the user is prompted to make a selection (814). Following the selection of a mobile operator, the inventory of available voucher values for the selected mobile operator is displayed and the user is prompted to make a selection (816). Following the selection of a voucher value, the inventory of available vouchers for the selected operator and value denominations are displayed and the user is prompted to select a quantity of vouchers that is less than or equal to the total quantity of vouchers available (818). Following the selection of one or more vouchers, the use is prompted to confirm the selection (819). Upon confirmation, the voucher transfer application 800 accesses voucher smart card 124 (719), retrieves the voucher data associated with the confirmed selection (720), updates the inventory on the voucher smart card 124 and stores the voucher data within the memory (not shown) of the transaction terminal 125 (721). In one example, the transfer of vouchers requires authorization. If the transaction terminal 125 is configured to receive only one smart card, the user is required to remove the voucher smart card 124 and replace it with the voucher encryption key smart card 126. In one example, the voucher encryption key smart card 126 is protected from unauthorized access with a Personal Identification Number (PIN) and the user is prompted to enter a valid PIN (822). The users types the PIN, the voucher transfer application 800 presents the PIN to the voucher encryption key smart card 126 for authorization (712) and the authorization result is returned to the voucher transfer application 800 (713). Upon successful authorization, the voucher data are transferred from the memory (not shown) of the transaction terminal 125 to a temporary storage repository on the voucher encryption key smart card 126 (714) and then the user is prompted to choose the transfer method (824). The transfer method is either a local "card to card" transfer or a remote transfer. If the user selects the local "card to card" transfer option, the user is prompted to insert the destination voucher smart card 124a (828). The voucher transfer application 800 retrieves the voucher data from the temporary storage repository on the voucher encryption key smart card 126 (715) and appends the voucher data to the destination voucher smart card 124a (722). After receiving the voucher data, the destination voucher smart card 124a provides an acknowledgement response to the transaction terminal application (723) that is further routed to the voucher encryption key smart card 126 to complete the card transfer transaction (716). If the transaction terminal is configured to receive only one smart card, the user is prompted to remove and insert the origin voucher smart card 124, the voucher encryption key smart card 126 and the destination voucher smart card 124a in the appropriate sequence to complete the transaction (830). If the user selects the remote transfer option, the user is prompted to enter the Identification Number of the destination transaction terminal (826). The voucher transfer application 800 transmits the voucher data to the mobile transaction server 191 over network 80 (724). Mobile transaction server 191 transmits an acknowledgment of the receipt of the voucher data over network 80 to transaction terminal 125 which is then routed to the voucher encryption key smart card 126 to complete the transaction from the origin of the transfer (716). The mobile transaction server 191 transmits a notification to the mobile transaction terminal 121 designated by the origin 826 over network 81 (726). The mobile transaction terminal 121 receives the notification (726) and transmits an acknowledgement and a download request from the mobile transaction server 191 over network 81 (727). The mobile transaction server 191 transmits the voucher download to mobile transaction terminal 121 over network 81 (728). The user is prompted to insert the voucher smart card 124b and a voucher transaction application 800a on the mobile transaction terminal 121 appends the voucher data to the destination voucher smart card 124b (729). A voucher data transfer acknowledgement is transmitted to the mobile transaction terminal 121(730) and routed to the mobile transaction server 191 over network 81 to complete the remote transfer transaction (731).

In another embodiment, the transaction terminal (mobile or otherwise) is also a payment terminal that enables the user to accept and process electronic payments as described in a co-pending patent application entitled "System and method for payment transaction authentication", the entire content of which is incorporated herein by reference. In another embodiment, the transaction terminal (mobile or otherwise) is also configured to receive magnetic stripe payment cards as described in a co-pending patent application entitled "Mobile Communication Device Equipped with a Magnetic stripe Reader". In another embodiment, the mobile transaction terminal 121 has no connection to the mobile transaction server. The voucher encryption key smart card 126 and the voucher smart card 124 1 store all transaction information that is transferred to another transaction terminal utilizing the "card to card" transfer method described in FIG. 8 and FIG. 9. In another embodiment, the Prepaid Host System 190 is any type of service that utilizes vouchers such as utilities, local phone service, long distance phone service, pay-per-view entertainment, electronic ticketing. In another embodiment, the encrypted vouchers are stored in the memory of the mobile transaction terminal 121 or transaction terminal 125. The memory is either internal to the mobile device or external and in connection with the mobile device (i.e. Compact Flash, Secure Digital, USB Flash memory, external hard drive). In yet another embodiment, the encrypted vouchers are stored in the memory 901 of the mobile phone attachment as described in PCT application WO 99/66752 entitled "Communication Method and Apparatus Improvement", shown in FIG. 10. Referring to FIG. 4, in another embodiment the mobile transaction terminal 121 has no network connection 81 with the mobile transaction server 191 and is a non-network connected device with the ability to interact with voucher encryption key smart card 126, voucher smart card 124 and optionally voucher printer 122.

Several embodiments of the present invention have been described. Nevertheless, it will be understood that various modifications may be made without departing from the spirit and scope of the invention. Accordingly, other embodiments are within the scope of the following claims.

The invention claimed is:

1. A system for generating and storing one or more prepaid electronic vouchers comprising:
    a voucher host system adapted to generate said prepaid electronic vouchers;
    a voucher smart card;
    a mobile communication device comprising a subscriber identification module (SIM) card slot and being adapted to connect to said voucher host system via a network connection and to download said prepaid electronic vouchers;
    a smart card reader/writer module adapted to electrically connect to said SIM card slot of said mobile communication device; and
    wherein said smart card reader/writer module comprises means for receiving said voucher smart card, means for storing information onto said voucher smart card, means for reading information from said voucher smart card and is adapted to receive said downloaded prepaid electronic vouchers from said mobile communication device and to store said prepaid electronic vouchers in said voucher smart card.

2. The system of claim 1 further comprising a transaction server adapted to mediate and aggregate transactions and communications between said mobile communication device and said voucher host system over said network connection.

3. The system of claim 2 wherein said communications comprise a format selected from a group consisting of Short Message Service (SMS), General Packet Radio Service (GPRS), Transmission Control Protocol/Internet Protocol (TCP/IP), User Datagram Protocol (UDP), Simple Mail Transmission Protocol (SMTP), Simple Network Management Protocol (SNMP), and proprietary message formats.

4. The system of claim 1 wherein said voucher smart card is selected from a group consisting of a "full size" smart credit card, a "full size" smart debit card, a "plug-in" Subscriber Identification Module (SIM) smart card, a "plug-in" Secure Access Module (SAM) smart card, a contactless smart card, a stored-value card, a coupon card, a reward card, an electronic cash card, a loyally card, an identification card and combinations thereof.

5. The system of claim 1 wherein said voucher smart card comprises a hardware security module (IISM) selected from a group consisting of microprocessors and storage accessories.

6. The system of claim 1 wherein said mobile communication device is selected from a group consisting of a mobile phone, a personal digital assistant (PDA), a pager, a point of sale (POS) -device, a television remote control, a personal computing device and combinations thereof.

7. The system of claim 1 wherein said network is selected from a group consisting of the Internet, a telecommunications network, a wireless wide area network (WWAN), a wireless local area network (WLAN), a personal area network (PAN) and a private communication network.

8. The system of claim 7 wherein said wireless wide area network (WWAN) is selected from a group consisting of a Global System for Mobile Communications(GSM), General Packet Radio Service (GPRS), a Code Division Multiple AccessRDMA), CDMA 2000, and wideband CDMA (WCDMA).

9. The system of claim 1 further comprising a printer adapted to connect to said mobile communication device for printing hard copies of said prepaid electronic vouchers.

10. The system of claim 9 wherein said printer is connected to said mobile communication device via a wired connection selected from a group consisting of a serial connection, a parallel connection, a USH connection and a mini USB connection.

11. The system of claim 9 wherein said printer is connected to said mobile communication device via a wireless connection selected from a group consisting of infrared, Bluetooth, 801. 1x, and short-range radio frequency (RE) connections.

12. The system of claim 1 wherein said prepaid electronic vouchers comprise data selected from a group consisting of a mobile operator code, a voucher number, a voucher expiration date, said voucher number in an encrypted format, a voucher value, voucher currency code, voucher product code, voucher product description, voucher owner code, and voucher owner.

13. The system of claim 1 wherein said prepaid electronic vouchers comprise encrypted data.

14. The system of claim 13 further comprising a voucher encryption smart card wherein said voucher encryption smart card comprises a voucher encryption key for decrypting said encrypted data.

15. The system of claim 14 wherein said voucher encryption key is selected from a group consisting of a personal identification number (PIN), a private key, a public key, a symmetric key and an asymmetric key.

16. The system of claim 14 wherein said decrypting utilizes techniques selected from a group consisting of symmetric keys, asymmetric keys, data encryption standard (DES, 3DES), RSA, elliptical curve cryptography (ECC), message authentication codes (MAC,HMAC,SHA-1, AES, and public key infrastructure (PKI).

17. The system of claim 1 wherein said mobile communication device further comprises a first voucher application wherein said first voucher application provides retrieving of said stored electronic prepaid vouchers from said voucher smart card and printing hard copies of said prepaid electronic vouchers.

18. The system of claim 17 wherein said first application further provides decrypting encrypted data stored in said electronic prepaid vouchers.

19. The system of claim 1 wherein said mobile communication device farther comprises a second voucher application wherein said second voucher application provides transferring one or more of said stored prepaid electronic vouchers from said voucher smart card to another voucher smart card.

20. A method for generating and distributing one or more prepaid electronic vouchers issued by a merchant for providing a service or a product, said method comprising:
    providing a voucher host system adapted to generate said prepaid electronic vouchers;
    providing a mobile communication device comprising a subscriber identification module (SIM) card slot and being adapted to connect to said voucher host system via a network connection and to download said prepaid electronic vouchers;

providing a smart card reader/writer module comprising means for receiving a voucher smart card, means for storing information onto said voucher smart card, means for reading information from said voucher smart card and electrically connecting said smart card reader/writer to said SIM card slot of said mobile communication device, wherein said smart card reader/writer is adapted to receive said downloaded prepaid electronic vouchers from said mobile communication device and to store said prepaid electronic vouchers in said voucher smart card;

placing a purchase order and paying for one of said one or more prepaid electronic vouchers from said mobile communication device to said voucher host system over said network connection;

downloading said one prepaid electronic voucher from said voucher host system to said mobile communication device via said network connection and storing said one prepaid electronic voucher in said voucher smart card;

retrieving said one prepaid electronic voucher from said voucher smart card; and presenting said one prepaid electronic voucher to said merchant and receiving said service or product.

21. The method of claim 20 further comprising providing a transaction server adapted to mediate and aggregate transactions and communications between said mobile communication device and said voucher host system over said network connection.

22. The method of claim 21 wherein said communications comprise a format selected from a group consisting of Short Message Service (SMS), General Packet Radio Service (GPRS), Transmission Control Protocol/Internet Protocol (TCP/IP), User Datagram Protocol (UDP), Simple Mail Transmission Protocol (SMTP), Simple Network Management Protocol (SNMP), and proprietary message formats.

23. The method of claim 20 further comprising printing a hard copy of said one prepaid electronic voucher before presenting said one prepaid electronic voucher to said merchant.

24. The method of claim 20 wherein said one electronic prepaid voucher comprises data selected from a group consisting of a mobile operator code, a voucher number, a voucher expiration date, said voucher number in an encrypted format, a voucher value, voucher currency code, voucher product code, voucher product description, voucher owner code, and voucher owner.

25. The method of claim 20 wherein said one prepaid electronic voucher comprises encrypted data.

26. The method of claim 25 wherein an encryption key for said encrypted data is stored in an encryption smart card.

27. The method of claim 26 further comprising decrypting said encrypted data by inserting said encryption smart card in said mobile communication device, retrieving said encryption key and using it to decrypt said encrypted data.

28. The method of claim 27 wherein said decrypting utilizes techniques selected from a group consisting of symmetric keys, asymmetric keys, data encryption standard (DES, 3DES), RSA, elliptical curve cryptography (ECC), message authentication codes (MAC, HMAC, SHA-1, AES, and public key infrastructure (PKI).

29. The method of claim 26 wherein said voucher encryption key is selected from a group consisting of a personal identification number (PIN), a private key, a public key, a symmetric key, and an asymmetric key.

30. The method of claim 20 wherein said voucher smart card is selected from a group consisting of a "till size" smart credit card, a "full size" smart debit card, a "plug-in" Subscriber Identification Module (SIM) smart card, a "plug-in" Secure Access Module (SAM) smart card, a contactless smart card, a stored-value card, a coupon card, a reward card, an electronic cash card, a loyalty card, an identification card and combinations thereof.

31. The method of claim 20 wherein said voucher smart card comprises a hardware security module (USM) selected from a group consisting of microprocessors and storage accessories.

32. The method of claim 20 wherein said mobile communication device is selected from a group consisting of a mobile phone, a personal digital assistant (PDA), a pager, a point of sale (POS) terminal, a television remote control, a personal computer and combinations thereof.

33. The method of claim 20 wherein said network is selected from a group consisting of the Internet, a telecommunications network, a wireless wide area network (WWAN), a wireless local area network (WLAN), a personal area network (PAN) and a private communication network.

34. The method of claim 33 wherein said wireless wide area network (WWAN) is selected from a group consisting of a Global System for Mobile Communications(GSM), General Packet Radio Service (GPRS), a Code Division Multiple Access(CDMA), CDMA 2000, and wideband CDMA(WCDMA).

35. The method of claim 20 wherein said mobile communication device further comprises a first voucher application wherein said first voucher application provides said retrieving of said stored electronic prepaid vouchers from said voucher smart card and printing hard copies of said prepaid electronic vouchers.

36. The method of claim 35 wherein said first application farther provides decrypting of encrypted data stored in said electronic prepaid voucher.

37. The method of claim 35 wherein said mobile communication device further comprises a second voucher application wherein said second voucher application provides transferring one or more of said stored prepaid electronic vouchers from said voucher smart card to another voucher smart card.

38. The method of claim 20 further comprising transferring said one prepaid voucher from said voucher smart card to a second voucher smart card.

39. The method of claim 20 further comprising transferring said one prepaid voucher from said voucher smart card to a second mobile communication device.

* * * * *